United States Patent
James

(10) Patent No.: US 8,386,170 B2
(45) Date of Patent: Feb. 26, 2013

(54) AUTOMATIC CREATION OF SCENIC TOURS USING POINTS OF INTEREST

(75) Inventor: Frances H. James, Sunnyvale, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 421 days.

(21) Appl. No.: 12/839,570

(22) Filed: Jul. 20, 2010

(65) Prior Publication Data

US 2012/0022777 A1 Jan. 26, 2012

(51) Int. Cl.
*G01C 21/00* (2006.01)
*G01C 21/30* (2006.01)

(52) U.S. Cl. ......... 701/426; 701/428; 701/419; 701/425
(58) Field of Classification Search .................. 701/419, 701/425, 426
See application file for complete search history.

(56) References Cited

U.S. PATENT DOCUMENTS

| | | | |
|---|---|---|---|
| 6,266,614 B1 * | 7/2001 | Alumbaugh | 701/468 |
| 6,845,321 B1 | 1/2005 | Kerns | |
| 7,330,786 B2 | 2/2008 | Odinak et al. | |
| 7,577,518 B2 | 8/2009 | Ishida et al. | |
| 7,583,972 B2 | 9/2009 | Clipsham | |
| 7,584,051 B2 | 9/2009 | Hayashi | |
| 7,962,284 B2 * | 6/2011 | Cutitta, II | 701/426 |
| 2001/0020211 A1 * | 9/2001 | Takayama et al. | 701/200 |
| 2003/0009281 A1 * | 1/2003 | Whitham | 701/211 |
| 2003/0182052 A1 * | 9/2003 | DeLorme et al. | 701/201 |

* cited by examiner

*Primary Examiner* — James Trammell
*Assistant Examiner* — Demetra Smith-Stewart

(57) ABSTRACT

A method is provided for presenting audio information related to scenic points of interest (POIs) to a user traveling along a predetermined route. The predetermined route is guided by a navigation device for providing audio navigation announcements that include turn-by-turn directions to the user. The predetermined route is defined between the starting location and a destination that includes scenic POIs. Audio navigation announcements are output to the user for selectively guiding the user along the predetermined route. An active region around each POI while traveling along the predetermined route is used to identify a current POI. Audio POI information is reproduced relating to the current POI while the user is within the active region of the current POI. Audio POI information reproduced to the user is selectively scheduled at a time not conflicting with the audio navigation announcements output to the user.

20 Claims, 2 Drawing Sheets

US 8,386,170 B2

AUTOMATIC CREATION OF SCENIC TOURS USING POINTS OF INTEREST

BACKGROUND OF INVENTION

An embodiment relates generally to reproduction of audio for a scenic tour.

Scenic tours often include a predetermined scenic route having predetermined points of interest (POIs) that are observable to a party of interest traveling along the predetermined route. Audio files are often used to supplement information relating to points of interest observed. The audio content of the audio files are blindly played when in close proximity to a POI.

In addition, navigation devices are utilized on scenic tours to guide the user along the predetermined scenic route. The navigation devices provide turn-by-turn instructions directions in the form of audio output to guide the user along the predetermined route. An issue with utilizing a device or system where audio navigation instructions and audio information relating to the POIs is output from a same output device is the interruption of one of the audio outputs if both are played at a same time. That is, when a point of interest is being observed and when the predetermined route requires a turn or similar maneuver. If both audio outputs are scheduled for playback by the same device, then either the navigation instructions will not be announced or the audio information relating to the POIs will be interrupted. If POI information takes priority, then it is possible that navigation instructions will not be announced thereby potentially missing a turn instruction. If the navigation information takes priority, then it is possible that POI information may be missed or interrupted, such that the user does not hear information about the POI, or hears the content but does not understand it because of the interruption.

SUMMARY OF INVENTION

An advantage of an embodiment is the cooperative and complimentary reproduction of audio POI information and navigation instruction announcements which are linearly reproduced to the party of interest without overlapping the audio output of either announcement. Audio POI information is output at a time when the navigation instruction are not being reproduced to the user. Moreover, audio POI information is automatically prioritized and scheduled when multiple POIs are in close proximity to one another.

An embodiment contemplates a method of presenting audio information related to scenic points of interest to a user traveling along a predetermined route. The predetermined route is guided by a navigation device for providing audio navigation announcements that include turn-by-turn directions to the user. The predetermined route is defined between the starting location and a destination that includes scenic points of interest. Audio navigation announcements are output to the user for selectively guiding the user along the predetermined route. An active region is identified around each point of interest while traveling along the predetermined route. Audio point of interest information that relates to the current point of interest is reproduced to the user while the user is within the active region of the current point of interest. The audio point of interest information reproduced to the user is selectively scheduled at a time not conflicting with the audio navigation announcements output to the user.

A guided tour output system is provided for outputting audio point of interest information relating to scenic points of interests for a user traveling along a predetermined route. The output system includes a navigation module for generating turn-by-turn directions that provide audio navigation announcements for guiding the user to each point of interest along the predetermined route. A point of interest information module generates the audio point of interest information relating to the respective point of interest while the user is within an active region corresponding to the point of interest. The active region encompasses an area that is within a respective distance from the respective point of interest. An audio output device reproduces the audio navigation announcements and the audio point of interest information to a user. The audio point of interest information reproduced to the user is selectively scheduled at a time not conflicting with the audio navigation announcements output to the user.

DETAILED DESCRIPTION

Figure 1:
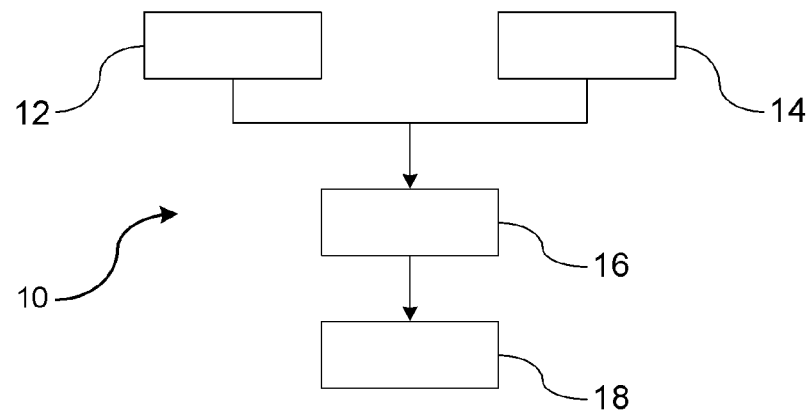
FIG. 1 is a block diagram of a guided tour audio output system.

There is shown in FIG. 1 a block diagram of a guided tour audio output system. The guided tour audio output system outputs audio points of interest (POI) information to an interested party traveling along a predetermined route. POIs are locations that a party of interest traveling along the predetermined route is interested in observing. POIs may be located on the road of travel of the predetermined route or may be a distance from the road of travel, yet observable to the interested party from the road of travel.

The guided tour audio output system 10 includes a navigation module 12 for generating turn-by-turn directions. The turn-by-turn directions provide navigation instructions for guiding the interested party along the predetermined route.

The guided tour audio output system includes a POI information module 14 for reproducing audio POI information while the interested party is within the active region associated with the respective POI. The active region encompasses an area up to a respective distance (e.g., radius) from the respective POI.

A controller 16 is communicably coupled to the navigation module 12 and the POI information module 14 for determining a time when the audio POI information should be reproduced to the interested party. The controller 16 determines time slots for reproduction of audio POI information as a function of the predetermined route, a time when the active regions will be reached, a time duration of the active regions, a time when the navigation announcements will be output, and a duration of the navigation announcements.

The guided tour audio output system further includes an audio output device 18 (e.g., speaker) for reproducing the audio navigation announcements and the POI information to the interested party. The controller 16 outputs the audio POI information via the audio output device 18 when the interested party is within the active region for the POI, and more importantly, when the audio navigation announcement is not being output to the interested party.

The navigation module 12, POI information module 14, controller 16 may be integrated as a single unit that can be a portable unit carried by the interested party or may be a device that is fixed within the transportation apparatus of the interested party (e.g., vehicle-based). Moreover, the audio output device 18 may be integrated as part of the single unit or may be a speaker system for the transportation apparatus in which the navigation announcements and POI announcements are cooperatively reproduced to the interested party.

Figure 2:
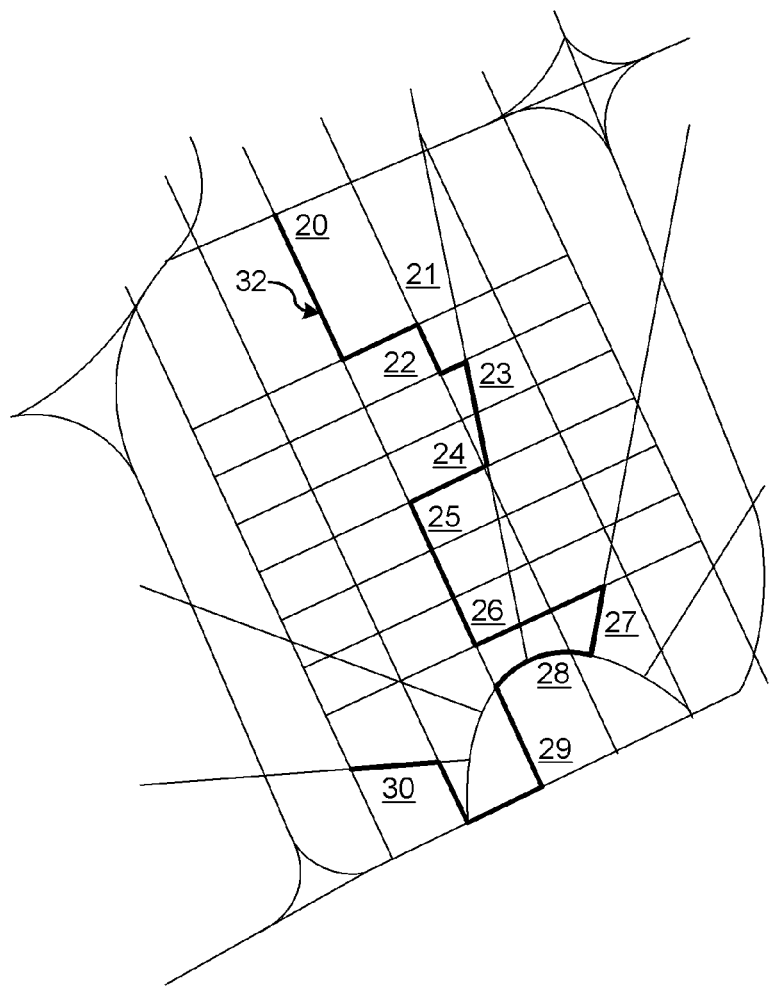
FIG. 2 is an exemplary diagram of a scenic navigation route of a geographical location.

There is shown in FIG. 2, an exemplary map of a geographical location having a plurality of points of interest (POI) 20-30. The plurality of POIs are respective geographical sites having some relevance or interest to a user (i.e., an interested party) traveling along a predetermined route 32 that is illustrated by a darkened line. The predetermined route 32 may be a route designed by the interested party intending to the travel along the predetermined route. Alternatively, the predetermined route 32 may be generated by professional entities, organizations, or individuals who have an interest in generating scenic tours concerning a particular subject matter. For example, historical societies may develop a predetermined route than that includes historical sites; sports societies may develop a predetermined route that includes sporting event sites; or automobile enthusiasts may develop a predetermined route that includes roads that are deemed fun or exciting to drive on. The interested party may be a driver and/or passengers of the vehicle, or a pedestrian utilizing any mode of transportation including, but not limited to, non-motorized transportation such as bicycling or walking.

The following are exemplary POIs that a person may desire to see along the predetermined route 32. The POIs include, but are not limited to, a college campus 20, a history museum 21, an art exhibit 22, a historical building 23, a city capital building 24, a justice building 25, a performance theatre 26, a sporting location 27, a zoo 28, a park 29, a historical battle ground 30.

A navigation device may be used to provide turn-by-turn directions to the user when traveling along the predetermined route 32. The turn-by-turn directions are audibly announced to the interested party. In addition to the turn-by-turn directions, information relating to each of the POIs is audibly reproduced to the interested party.

The audio POI information is reproduced when an interested party is within an active region of a respective POI. An active region encompasses an area that is within a respective distance from the respective POI. The active region is defined by the entity, group, or individual generating the predetermined route and associated POIs. It is desirable to have the audio POI information reproduced while the interested party is observing the POI. It is essential that the audio POI information is not reproduced at a time when the audio turn-by-turn navigation instructions are announced; otherwise, the reproduction of audio POI information will be interrupted. Therefore, audio POI information must be selectively reproduced over a time period when the interested party is within an active region of a POI and when the audio navigation instructions are not being announced.

Figure 3:
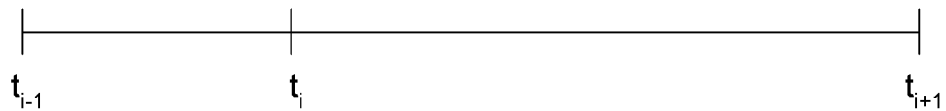
FIG. 3 is a timeline section of the scenic navigation route.

To selectively reproduce the audio POI information for each respective POI along the predetermined route, the predetermined route is mapped as a timeline 40 as illustrated in FIG. 3. Each POI is mapped as a respective point in time that will be reached based on a current location and travel speed of the interested party. Similarly, each turn in the route is mapped as a respective point on the timeline based on the same criteria. The timeline may be continuously updated to account for changes in speeds, traffic flow, and stops.

To determine a time when each active region or turn is reached, a current location of the interested party is determined. The current location may be determined by utilizing a global positioning device (GPS) or similar device.

FIG. 3 illustrates two respective turns $t_i$ and $t_{i+1}$ along the timeline. A time to travel between respective turns is determined based on the vehicle current position, the distance, and average velocity. The formula for determining the time between respective turns is as follows:

$$t_i = t_{i-1} + \frac{d_i}{v_i}$$

where $t_i$ is a time to reach the next turn from a current location, $d_i$ is a distance between points (i-1) and (i), and $v_i$ is an average velocity between points (i-1) and (i). It should be understood that when the system updates the time, (i-1) may be a current position if the current position is not at a turn or point of interest. An estimated time of arrival is determined for each of the turns on the predetermined route.

After the time is generated between each respective turn, a time of arrival is estimated to reach a boundary of each active region for the route's POIs, so that a determination may be made when to reproduce the audio POI information for each POI. It should be understood that various methods may be used to determine when an active region is reached without deviating from the embodiment described herein. For example, the location of the boundary of the active region along the predetermined route may be determined utilizing timing parameters or distance parameters. Moreover, a direct calculation based on a latitude and longitude coordinate to the beginning (e.g., boundary) of the active region on the predetermined route may be a more precise calculation than described above if the latitude and longitude coordinate of the point of interest is not on the road of travel of the predetermined route (i.e., if the point of interest is set far back from the road of travel or on a private road that is not accessible but still visible from the road of travel).

Figure 4:
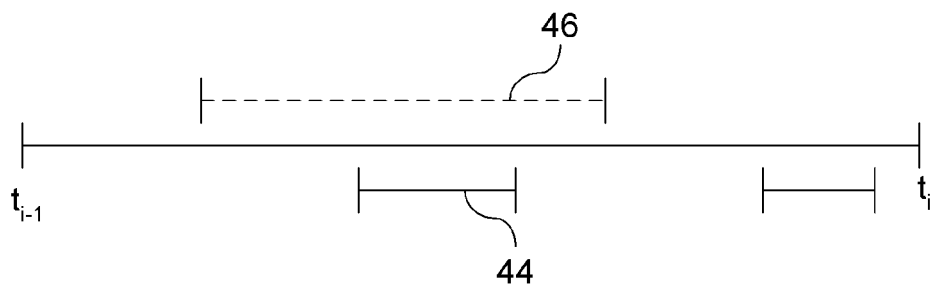
FIG. 4 is a timeline section illustrating audio navigation announcements and POI active regions.

FIG. 4 illustrates a timeline showing audio navigation announcements and active regions for reproduction of audio POI information. The audio POI information must be reproduced to the interested party at a time when a respective navigation announcement 44 is currently not being output. An active region 46 is a respective area which is optimal for reproducing the audio POI information for the interested party so that the interested party can listen to information relating to the POI while observing the POI. Reproduction of audio POI information outside of the active region 46 causes a disconnect between a time when the interested party views the POI and the time when the interested party listens to the audio POI information, which is undesirable and may be confusing.

As shown in FIG. 4 the estimated time period 44 when the navigation announcement is expected to be output to the interested party overlaps a portion of the active region 46. Since the navigation announcement 44 has priority over the audio POI information as it would be unfavorable to miss a turn instruction and stray from the predetermined route, audio POI information should not be reproduced during this time period. Therefore, audio POI information should ideally be reproduced in the active region 46 either prior to or after the navigation announcement 44. The navigation announcement is typically initiated when the interested party is a predetermined distance (e.g., 0.5 miles) from the POI, based on the algorithm used by the navigation device. The length of time for the navigation announcement is a function of both the number of words in the announcement and a rate at which the words of the navigation announcement are output. A formula for determining a time duration for a respective navigation audio instruction announcement is represented by the following formula:

$$t_a = \frac{w_a}{wpm}$$

where $t_a$ is a time duration of the navigation audio instruction announcement, $w_a$ is a number of words in the announcement, wpm ("words per minute") is a rate at which the words of the navigation audio instruction announcement are output.

Figure 5:
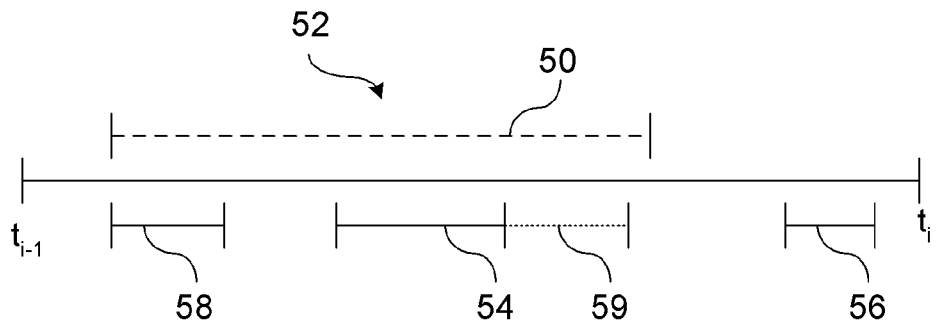
FIG. 5 is a timeline section illustrating audio POI information reproduction.

FIG. 5 illustrates a respective timeline having options for reproducing the audio POI information for a respective POI within the active region. The active region for reproducing the audio POI information is represented by 50. The active region 50 represents a region in which audio POI information may reproduced for a POI 52. It should be understood that the POI 52 is a location that may either be directly next to the road of travel or may be at a location that is distal from the road of travel but is observable to the interested party from the road of travel. Point $t_i$ represents a location at which a turn maneuver or other type of steering maneuver is performed. As a result, it is the respective active region along the road of travel which is used to determine when to initiate the audio POI information.

Audio navigation turn announcements that are determined based on the respective number of words and the word rate output are represented by 54 and 56. Turn announcement 54 represents first navigation announcement for approaching turn maneuver $t_i$ as an initial notification to the interested party. Turn announcement 56 represents a next navigation announcement to remind the interested party of the approaching turn maneuver $t_i$.

As illustrated in FIG. 5, an audio POI announcement may be reproduced over time period 58, which is output in its entirety prior to the navigation announcement 54. Alternatively, if the duration of time is not conducive for reproducing the audio POI information prior to navigation announcement 54, the audio POI information may be reproduced over time period 59, which is output in its entirety after the navigation announcement 54. Preferably, the audio POI information for a single POI is initiated at an earliest possible start time when the interested party is within an active region of the single POI.

Figure 6:
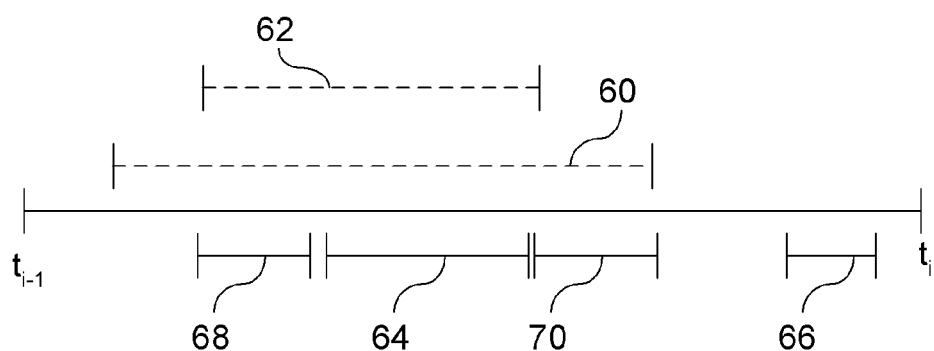
FIG. 6 is a timeline section illustrating multiple overlapping POI information reproduction.

FIG. 6 illustrates a respective timeline having multiple POIs with active regions that overlap one another. Active regions for reproducing the audio POI information for two POIs are represented by 60 and 62, respectively. Audio navigation turn announcements that are determined based on the respective number of words and the word rate output are represented by 64 and 66. As shown in FIG. 6, audio POI information for both POIs must be 'best fit' into a timeline either on a priority basis or other heuristic rules. For example, the audio POI announcement for active region 62 may be reproduced first based on predetermined rating, importance rating, a user rating (i.e., the user rates which are most important), or based on which audio POI information best fits the timeline taking into consideration the time constraints resulting from the navigation announcement. That is, if the active region 62 is of a duration that only allows audio POI announcement to fit prior to the navigation announcement 64 and if active region 60 is of a sufficient time period for reproducing audio POI information after the navigation announcement 64, then each audio POI information announcement is selected to 'best fit' the timeline given the timing constraints of the navigation announcement and the active regions.

In FIG. 6, the audio POI information relating to POI 62 is reproduced within time period 68 that is prior to the navigation announcement 64, whereas audio POI information relating to POI 60 is reproduced within time period 70 that is after navigation announcement 68. For a small number of overlapping POIs, multiple prioritizations may be tested to determine which alternative provides successful results in reproducing all audio POI announcements while satisfying the priority requirements. If one or more POIs cannot be scheduled on the timeline, then one or more POIs may be dropped. The POIs to drop may be determined utilizing heuristic rules that set forth respective criteria for dropping POIs.

Other options for fitting the audio POI information announcement within the timeline may include splitting a single audio POI information announcement such that a first portion of the audio POI announcement is reproduced prior to the navigation announcement and a second portion of the audio POI announcement is reproduced after the navigation announcement. The location of where to split the single audio POI information announcement may be defined by the interested party. Moreover, extending the length of time for an active region for announcing audio POI information as a whole for a respective POI may also be reconfigured by the interested party.

It should be understood that although the examples illustrated herein are described in terms of time, the timeline based calculations may be described in terms of distance by reconfiguring each of the formulas for outputting a distance parameter.

While certain embodiments of the present invention have been described in detail, those familiar with the art to which this invention relates will recognize various alternative designs and embodiments for practicing the invention as defined by the following claims.

What is claimed is:
1. A method of presenting audio information related to scenic points of interest to a user traveling along a predetermined route, the predetermined route being guided by a navigation device for providing audio navigation announcements that include turn-by-turn directions to the user, the method comprising the steps of:
defining the predetermined route between the starting location and a destination that includes scenic points of interest;
outputting audio navigation announcements to the user for selectively guiding the user along the predetermined route;
identifying an active region around each point of interest along the predetermined route; and
reproducing to the user audio point of interest information relating to a current point of interest while the user is within the active region of the current point of interest, wherein the audio point of interest information reproduced to the user is selectively scheduled, by a controller, at a time not conflicting with the audio navigation announcements output to the user.
2. The method of claim 1 further comprising the step of determining a time until the respective active region is reached, the time being a function of a velocity that the user is traveling and the distance between a user's current position and the respective active region.

3. The method of claim 2 further wherein determining a time until the respective active region is reached comprises the following steps:
  estimating a time until a next point of interest is reached based on the velocity that the interested party is currently traveling;
  estimating a time from a boundary of the active region to the next point of interest based on the velocity that the interested party is currently traveling; and
  predicting a time until the active region is reached as a function of the estimated time to the next point of interest and the estimated time from the boundary of the active region to the next point of interest.

4. The method of claim 2 wherein determining a time until the respective active region is reached comprises the following steps:
  identifying a coordinate of a boundary of the respective active region associated with the next point of interest along the predetermined route;
  determining a velocity that the interested party is currently traveling; and
  estimating a time of arrival to the boundary of the respective active region in response to a distance to the identified coordinate from the current position and the velocity that the interested party is currently traveling.

5. The method of claim 2 wherein the active region encompasses an area within a respective distance from the respective point of interest, and wherein the area of the active region is defined by an entity generating the predetermined route with associated points of interest.

6. The method of claim 2 wherein the step of outputting navigation audio instructions to the user for selectively guiding the user along the predetermined route includes determining a time when the navigation audio instructions will be announced.

7. The method of claim 6 further comprising the step of determining a time duration for the navigation audio instruction announcement, wherein the time duration is determined as a function of a number of words in the navigation audio instruction announcement and a rate at which the words of the navigation audio instruction announcement are output.

8. The method of claim 7 wherein the time duration for the navigation audio instruction announcement is represented by the following formula:

$$t_a = \frac{w_a}{wpm}$$

where $t_a$ is a time duration of the navigation audio instruction announcement, $w_a$ is a number of words in the announcement, wpm is a rate at which the words of the navigation audio instruction announcement are output.

9. The method of claim 7 further comprising the steps of determining a time for initiating the audio points of interest information reproduction relating to the respective point of interest, wherein the time for initiating the audio point of interest information reproduction is initiated at an earliest possible time once the active region is reached.

10. The method of claim 7 further comprising the steps of reproducing a plurality of audio point of interest information to the user, each of the plurality of audio point of interest information relates to a respective point of interest, wherein each respective point of interest is in close proximity to one another resulting in an overlapping of active regions, wherein the plurality of audio point of interest information is reproduced linearly.

11. The method of claim 10 wherein an order for reproducing the plurality of audio point of interest information linearly is based on a predetermined priority rating associated with each respective point of interest.

12. The method of claim 11 wherein the predetermined priority is defined by the user.

13. The method of claim 10 wherein the plurality of audio point of interest information reproduced linearly is based on optimizing available time slots before and after the navigation announcement, wherein optimizing available time slots includes selectively grouping respective audio point of interest information before and after the navigation announcement that can best fit within available time slots.

14. The method of claim 10 wherein at least one audio point of interest information is selected for not being reproduced in response to a lack of available time.

15. The method of claim 14 wherein at least one audio point of interest information selected is based on the respective audio point of interest information having a lowest priority.

16. The method of claim 1 wherein the user is disposed in a vehicle traveling along the predetermined route.

17. A guided tour output system for outputting audio point of interest information relating to scenic points of interests for a user traveling along a predetermined route, the output system comprising:
  a navigation module for generating turn-by-turn directions that provide audio navigation announcements for guiding the user to each point of interest along the predetermined route;
  a point of interest information module for generating the audio point of interest information relating to the respective point of interest while the user is within an active region corresponding to the point of interest, the active region encompassing an area that is within a respective distance from the respective point of interest; and
  an audio output device for reproducing the audio navigation announcements and the audio point of interest information to a user;
  wherein the audio point of interest information reproduced to the user is selectively scheduled, by a controller, at a time not conflicting with the audio navigation announcements output to the user.

18. The guided tour output system of claim 17 wherein the navigation module, the point of interest information module, and the audio output device are integrated within a single unit.

19. The guided tour output system of claim 18, wherein the single unit is a portable device.

20. The guided tour output system of claim 18, wherein the single unit is a vehicle-based device.

* * * * *